Figure 1:
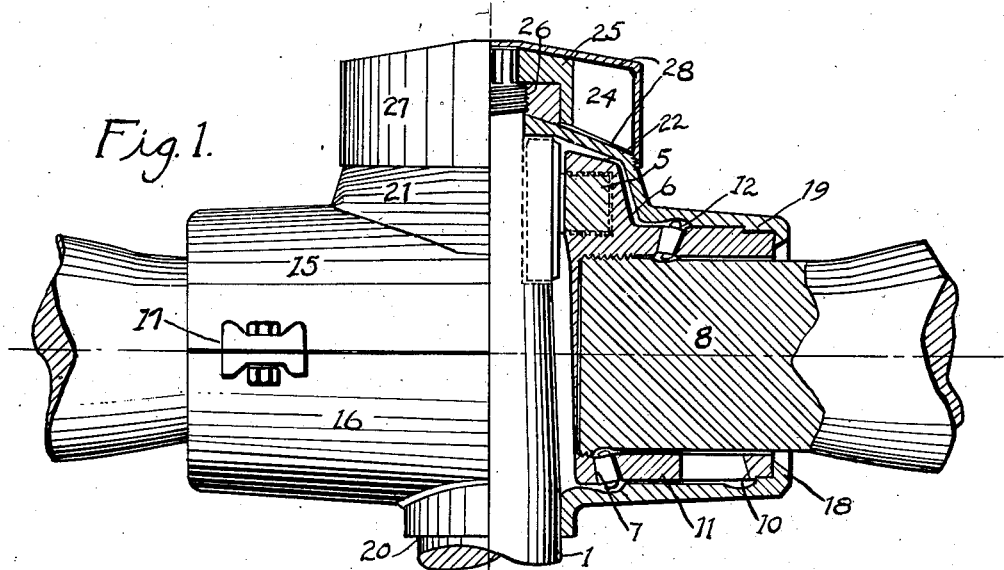

Nov. 5, 1935.   E. L. COATES   2,020,239
VARIABLE PITCH PROPELLER
Filed March 6, 1934

WITNESS:
C. M. Watt

Inventor:
Earl L. Coates

Patented Nov. 5, 1935

2,020,239

UNITED STATES PATENT OFFICE 2,020,239

VARIABLE PITCH PROPELLER

Earl L. Coates, Pittsburgh, Pa.

Application March 6, 1934, Serial No. 714,221

4 Claims. (Cl. 170—162)

My invention relates to an improved method of automatically obtaining a variation in blade angle of a propeller under varying operating conditions through the utilization of forces to which the blades themselves are subject. The changing conditions affecting the operation and efficiency of an airplane propeller are, in an elementary sense, a variation with the propeller's forward speed of advance of the incidence angle of all portions of a blade, and a variation of air density with altitude.

The magnitudes of the forces to which a rotating propeller is subject are, in a manner, an indirect result of the operating conditions. The relation involved is usually rather complex in the case of the aerodynamic pressure creating a bending stress on the blade manifested as thrust and torque, acting respectively parallel and concentric with the drive shaft. However, the centrifugal force exerted perpendicular to the drive shaft as tension in the blades is a simple function of the rate of rotation, which conversely, may be said to have a certain different value for every amount of its induced force.

For example, holding the centrifugal force a constant would necessarily entail a fixed rate of rotation, a result which this invention aims to accomplish by arranging that any momentary variation, with the rate of rotation, of this force from an assigned amount shall act, through the medium of pitch adjustment, to cause the rate to return to its former value. More specifically, this is effected by opposing a proportional part of the centrifugal force with a uniform resistance, in such a manner that if the two forces become unbalanced, movement results, and is communicated to change the pitch. Thus, identical with a governor, the blades being the revolving weights, there is a set speed of balance or steady motion, closely maintained except for slight departures that must precede any adjustment to changed conditions.

As a means for putting into effect this principle, the force set up in opposition to that exerted centrifugally by the blades is derived from the torque delivered to the propeller as a driving effort exerted at some convenient radius. Generally considered, these two forces may be shown by a graph as in Figure 4 of the accompanying drawing.

Like the whole, any constant fraction of the centrifugal force will vary directly as the square of the rate of rotation, represented graphically by a parabola. As shown, the driving force at constant radius decreases slightly with the rate in the case of an internal combustion engine. The intersection of the two curves gives the balancing point of the forces and consequently the propeller speed that will be maintained.

Each of the curves obtained may be any one of a family of similar ones (e. g. as shown in dotted lines) dependent on the amount of the whole centrifugal force and what proportionate part is utilized, and upon the value of the torque and the radius at which it is taken. In any case the speed of balance is a function of the relation designed to hold between the two forces, and may thus be definitely set at any desired point.

However, how the required relation is obtained in any actual design may be influenced by a combination of mechanical and structural considerations. For example, the driving force taken at the smallest radius that safe stresses will permit must act through a considerable mechanical advantage against the much larger centrifugal force present at normal propeller speeds.

As affording a practical means of accomplishing the above purpose the following simple and effective mechanism at the hub of the propeller is set forth. It is based on the turning moments produced by the action of the centrifugal forces of the blades on the inclinations of corresponding helixes fixed within the hub. Opposing moments are set up about the axes of the several helixes by exerting the propeller driving torque through suitable connections. When the moments are unbalanced the resulting angular displacements are conveyed directly to the blades.

Essentially, the arrangement comprises a hub in which the centrifugal force of each blade is taken by a corresponding helically faced antifriction thrust bearing in place of the usual plane type. Instead of by splines engaging the hub, the engine shaft exerts a positive drive through teeth faces, bearing upon and including an opposing moment about each blade shank. In addition, an auxiliary hydraulic device prevents sudden and over changes of pitch by forcing oil through a small clearance between vanes and a containing enclosure.

Although applicable to a propeller of any number of blades, the complete mechanism is illustrated by a two bladed propeller in the accompanying drawing, in which—

Figure 2:
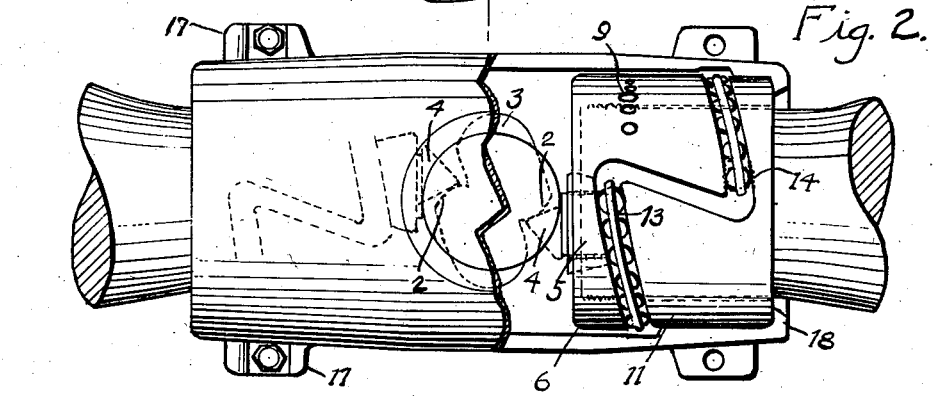
Figure 3:
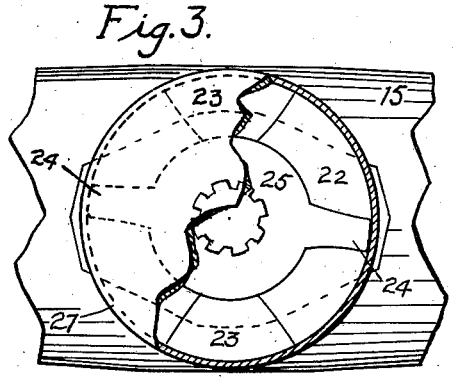
Figure 4:
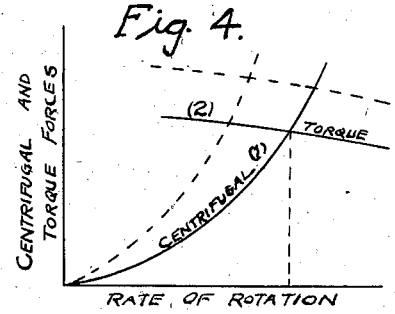

Figure 1 is a plan view with one-half the hub and enclosed parts in cross section; Figure 2, a rear elevation looking forward immediately aft of the hub; Figure 3, a fragmentary front elevation disclosing the vane contrivance; and, Figure 4 is a diagrammatic view illustrating the operation of my device. Corresponding parts in these views are marked with the same numerals.

The mechanism for one blade together with associated structures of hub and drive shaft are duplicated in the other blade in such an order or arrangement as would result from rotating one-half about the shaft to coincide with the other. With this understanding it is convenient, for the most part, to consider one blade singly.

For each blade the propeller or drive shaft I has, along a portion of its length, a groove, one inside face of which is a proper tooth curve 2, preferably an involute. Along this length the shaft is adequately reinforced for torque by a shape of such an appearance as 3 of Figure 2. At the more restricted front portion of the hub the wider part of the section 3 may be tapered for clearance. Forward of this the shaft is shortly extended narrowed to the diameter between the insides of the grooves, as shown. Additional strength of drive results from the rear of the section running or buttressing into the solid shaft which tapers back to the circular section at I.

Driving force is transferred to the propeller by the said shaft tooth face acting at a given effective radius on the tooth 4, formed in one piece with the threaded rod 5, and screwed loosely into a forward extension of the blade shank bearing ferrule 6. Thus, a nearly constant force acting with a lever arm equal to the distance from the center of rod 5 to the bearing axis, produces a large and almost uniform turning moment in the ferrule. This driving connection permits the taking place of a slight rotation relative to the hub, in one direction or the other, of the drive shaft and ferrule, during which there is rolling contact between the two teeth faces. At the same time the ferrule tooth 4 will accommodate itself for line contact evenly along its length by a slight turning of the rod 5 within the ferrule hole.

The outer end 7 of ferrule 6 forms a hardened helical bearing race of shape similar to a rather deep screw thread of large pitch. The inner end of the blade, a cylindrical shank 8, is held within the ferrule by threads and locked to prevent turning relative thereto by a pin 9 set through a radial hole or slot in both ferrule and outer blade shank. The pin is confined by the hub but may be screwed into one of the members as well. Several such holes circumferentially disposed as shown, together with others of slightly different angular spacing in the shank, will provide a vernier adjustment of short intervals for proper setting of the limits of blade angle travel.

The opposite bearing face 10, comprising a helical surface of exactly the same pitch as 7, forms the inner end of the sleeve II loosely encircling the blade shank and fixed within the hub. The bearing faces of both 6 and II extend around slightly over a complete revolution so that these pieces will be formed as shown in Figure 2. Each bearing face may be considered as a surface generated by a line preserving a constant ratio between its rotation rate about the bearing axis and its longitudinal movement. One line must be thought of as retaining a slight angle with the other such as would be proper for the interposition between the resulting surfaces of conical rollers 12 to give nearly perfect rolling contact. The expedient of inclining both surfaces as shown should also enable the single bearing to provide for radial loads, by virtue of the fact that it is simultaneously subjected to a centrifugal pressure many times greater. However, this extreme simplification need not be resorted to if separate radial bearings (especially to take the driving force, but not shown) are preferred.

The rollers and helical containing race 13, being discontinuous, are provided with a means for fixing their circular orientation by insuring against any possible slippage of the unit when bearing pressure is absent. On the end circumference of one roller is formed coarse milling or fine teeth engaging with a similar short strip on both races as shown at 14, Figure 2.

The hub, split into a front portion 15 and rear portion 16, is clamped together by bolts through lugs 17, thereby embracing the outer bearing cylinder II which is rigidly held within against hub end flange 18, and may be secured in the proper position against turning by receiving a projection in a groove at 19. The rear part of the hub provides a sleeve fit 20 to permit a slight rotation relative to the drive shaft. The front part is formed at 21 to enclose the bearing ferrule arm with inside clearance for a slight up and down movement of the latter. The forward end of this enclosure, constituting the front of the hub, is pierced by a centralized hole providing a close machine or oil tight fit about the narrowed end of the propeller shaft, and is fashioned as a conical or circular surface 22, with two projections 23, both accommodating a vane device as described below.

Two vanes 24, Figure 3, are formed with a cylindrical hub 25 splined as a sliding fit to the reduced end of the drive shaft and hollowed at its inner end to fit over and engage the nut 26 retaining the propeller on the shaft. The vane hub fits closely between the inside cylindrical segments of the projections 23, which, extending to the same depth and having a radial thickness equal to the length of the vanes, provide stops or partitions between the latter.

The vanes are enclosed by a cylinder 27, internally threaded at its open end and screwed to the circumference of the rear confining surface 22. The interior is filled with heavy oil through a hole (not shown) that may be supplied with a screwed plug or fitting. When pitch adjustment occurs the amount of damping resistance set up by the relative rotation between vane system and hub stops, is dependent upon the clearance at 28 between the vanes and enclosure, which slits may be finely adjusted by screwing the cylinder cap 27 slightly one way or another and locking it (e. g. as by a pin) where desired.

The convenience of and procedure in assembling the propeller is evident. When assembled, with the exception of the vane device, the whole is slipped onto the drive shaft, the teeth 4 entering the grooves until meeting the solid shaft at the rear at the same time that the rear hub sleeve fits over the shaft at I. Retaining nut 26 is then screwed on the shaft the proper amount and locked thereto by slipping the vane holding hub over both. Securing the vane cylinder cap 27 and introducing oil as previously mentioned completes the assembly.

In operation, when a change in conditions causes the propeller to exceed the speed at which it is designed to run, the consequent increase in blade centrifugal pressure on the helical bearing produces a proportionate rise in the turning moment it induces about the blade axis, thereby overcoming the uniform resisting moment maintained by the torque. The difference thus set up between the two moments rotates the blade in its bearing to increase the pitch, thereby simultaneously slowing the propeller speed and quickly restoring it to normal, at which point only can the system remain in balance. If propeller speeds falls below normal the opposite takes place causing the constant resisting moment to be the greater of the two and the pitch to be decreased. Incidentally, such adjustment of pitch is accompanied by a negligible change in propeller diameter.

The operation is conveniently illustrated graphically by more specific application of Figure 4 in letting the curves (1) and (2) represent the opposing turning moments induced in the blade shank bearing ferrule by centrifugal force and torque respectively. The difference between the moments that precedes the action explained above is clearly shown by points on both curves to either side of their intersection or point of normal propeller speed. The fact that the centrifugal moment increases much faster than the speed, while the resisting moment slightly decreases instead of remaining perfectly constant, augments this difference with advantages to sensitivity.

Other factors remaining constant, it should be noted that a change in engine throttle and torque delivered will result in a corresponding change in rate of rotation with little or no effect on the pitch. That is a nearly constant value of the latter satisfies the condition that the torque absorbed and therefore the resisting moment shall vary in accordance with the centrifugal moment: namely—as the square of the speed.

Working as previously described, the added vane device functions to render the mechanism absolutely stable in pitch adjustment, which it does through causing the changing blade angle to lag slightly behind that required by conditions at the moment, thereby preventing the over running of requirements and eliminating hunting. Being capable of resisting only while in motion, it can not affect the state of balance within the mechanism when at rest.

It should then be understood that the essential feature of the mechanism is the helical thrust bearing which makes it practicable to derive directly from the centrifugal force of the blades a governor moment satisfying the requirement of depending definitely on the rate of rotation.

This brings about advantages in functioning and simplicity. In the first place the friction which must be overcome to vary the blade angle in any variable pitch propeller, will be no more with the thrust bearing used herein than with the ordinary type. However, the moment which comes into play to change the blade angle against this friction, when the forces become unbalanced, is, in this case, not limited by a small centrifugal action. The moment produced by the latter may be made of any desired amount depending on the constructed pitch of the helix and need be limited only by the magnitude of the resisting moment possible of devising. Thus, the problem of obtaining a sufficient force difference to regulate the pitch upon a slight variation from the normal rate of rotation, which would be met in the use of an ordinary separate governor confined to comparatively small centrifugal action, is herein adequately solved. That is, a sufficient moment is set up by a small departure from normal propeller speed to overcome the certain unavoidable friction of effecting a pitch adjustment, thereby giving the degree of sensitivity desired in practice. Furthermore, this is accomplished without the complication of an independent governor and connections; the pitch adjusting rotation being resident in and communicated directly to the blades.

The actual proportioning of the working parts to maintain a desired propeller speed is subject to exact calculation. The angle or pitch of the helical bearing simply need be such that the thrust on it of the centrifugal force of the blade at the desired speed produces a bearing ferrule moment equal to the contemplated resisting moment. The latter, if derived from the torque as shown, is dependent upon the mechanical advantage with which the driving torque acts on the ferrule. It may be made adequate to provide for a sensitive pitch adjustment without sacrificing the compactness shown, since the driving torque per blade is reasonably large. Thus feasibility in regards to the size or proportion of parts is manifest.

Having now described my invention in regards to both its principle and a mode of applying the same, what I claim as new therein is as follows:

1. In combination, a variable pitch propeller and drive shaft therefor, a hub mounted on the drive shaft, propeller blades carried by the hub, load controlled adjustable fluid damped driving connections between the shaft and hub to effect a change angularly of the latter on the former, operative connections between the shaft and blades to impart radial movement of the blades as well as angular movement on their axes in any change of relative positions of the hub and shaft, and said operative connections including ferrules secured to the blades and having loose connections with the shaft, sleeves secured to the hub, said ferrules and sleeves having confronting ends shaped in spiral formation and cooperating to bring about said movements.

2. In combination a variable pitch propeller and drive shaft therefor, a hub mounted on the drive shaft, propeller blades carried by the hub, load controlled driving connections between the shaft and hub to effect a change angularly of the latter on the shaft, operative connections between the shaft and blades to impart radial movement of the blades as well as angular movement on their axes in any change of relative positions of the hub and shaft, said operative connections including ferrules adjustably secured to the blades and having loose connection with the shaft, sleeves secured to the hub, said sleeves and ferrules having confronting ends shaped in spiral formation for cooperation to bring about said movements, bearings between the confronting ends, and means to arrest movement of the bearings.

3. In combination, a variable pitch propeller and drive shaft therefor, a hub mounted on the drive shaft, propeller blades carried by the hub, load controlled adjustable fluid damped driving connections between the shaft and hub to effect a change angularly of the latter on the shaft, and operative connections between the shaft and blades to impart radial movement of the blades as well as angular movement on their axes in any change of relative positions of the hub and shaft, said operative connections including ferrules threaded and adjustably secured to the blades, extensions formed on the ferrules, toothed means connecting the extensions with the shaft and mounted for movement relative to the extensions and shaft, sleeves secured to the hub, and said sleeves and ferrules having confronting ends shaped in spiral formation for cooperation to bring about said movements.

4. In combination, a variable pitch propeller and drive shaft therefor, a hub mounted on the drive shaft, propeller blades carried by the hub, load controlled damped driving connections between the shaft and hub to effect a change angularly of the latter on the shaft and including projections carried by the hub, vane carrying means secured to the shaft with the vanes thereof disposed in spaced cooperation with the projections and a fluid between the same, adjustable means to allow transfer of the fluid about the projections and vanes, and operative connections between the shaft and the blades to impart axial movement of the blades and angular movement on their axes in any change of relative positions of the hub and shaft.

EARL L. COATES.